(12) United States Patent
van der Molen

(10) Patent No.: US 8,794,488 B2
(45) Date of Patent: Aug. 5, 2014

(54) CONTAINER WITH A PORTION DISPENSING DEVICE

(75) Inventor: Peter Jan van der Molen, The Hague (NL)

(73) Assignee: IPN IP B.V., Houten (NL)

( * ) Notice: Subject to any disclaimer, the term of this patent is extended or adjusted under 35 U.S.C. 154(b) by 135 days.

(21) Appl. No.: 13/635,429

(22) PCT Filed: Mar. 15, 2011

(86) PCT No.: PCT/NL2011/050181
§ 371 (c)(1),
(2), (4) Date: Sep. 16, 2012

(87) PCT Pub. No.: WO2011/115484
PCT Pub. Date: Sep. 22, 2011

(65) Prior Publication Data
US 2013/0037575 A1    Feb. 14, 2013
US 2013/0206795 A2    Aug. 15, 2013

(30) Foreign Application Priority Data

Mar. 17, 2010  (NL) .................................... 2004416
Jun. 17, 2010  (NL) .................................... 2004912

(51) Int. Cl.
*B65D 37/00*  (2006.01)
(52) U.S. Cl.
USPC .......................................................... 222/207
(58) Field of Classification Search
CPC ........................ B05B 11/3032; B05B 11/3087
USPC ......... 222/212, 361, 453, 476, 213, 207, 365, 222/449, 344, 341, 438
See application file for complete search history.

(56) References Cited

U.S. PATENT DOCUMENTS 5,289,948 A * 3/1994 Moss et al. ..................... 222/135
5,850,908 A * 12/1998 Jasek ........................ 220/203.23
(Continued)

FOREIGN PATENT DOCUMENTS

WO     9008073 A1     7/1990
WO     0037179 A1     6/2000

OTHER PUBLICATIONS

NL 2004416 Search Report, Jan. 17, 2011.
(Continued)

*Primary Examiner* — Kevin P Shaver
*Assistant Examiner* — Robert Nichols, II
(74) *Attorney, Agent, or Firm* — Troutman Sanders LLP; Ryan A. Schneider; Benjamin C. Wiles

(57) ABSTRACT

A container (1) with a portion dispensing device for dispensing portions of a product from the container. The container has a main reservoir (2) for storage of product. The portion dispensing device comprises a variable volume product chamber (30) and associated restoring means. The variable volume product chamber (30) has a product outlet and an outlet valve (45). The product chamber also has a product inlet in communication with the main reservoir (2) and an inlet valve. The variable volume product chamber (30) has a volume that is reduced upon increased pressurization of product in the main reservoir (2) of the container (1), and that is increased, at when the increased pressurization of product in the main reservoir (2) of the container (1) is removed. The inlet valve (60) closes the product inlet upon increase of pressurization of the product in the main reservoir (2) so that product passes from the chamber via the product outlet. The inlet valve (60) opens the product inlet upon removal of said increased pressurization.

22 Claims, 17 Drawing Sheets

(56) References Cited

U.S. PATENT DOCUMENTS

| | | |
|---|---|---|
| 6,341,718 B1 | 1/2002 | Schilthuizen et al. |
| 6,343,716 B1 * | 2/2002 | Baudin et al. .................. 222/207 |
| 6,484,906 B2 * | 11/2002 | Bonningue .................. 222/207 |
| 8,434,647 B2 * | 5/2013 | Aamar .......................... 222/207 |

OTHER PUBLICATIONS

PCT/NL2011/050181 Search Report, Jun. 10, 2011.

* cited by examiner

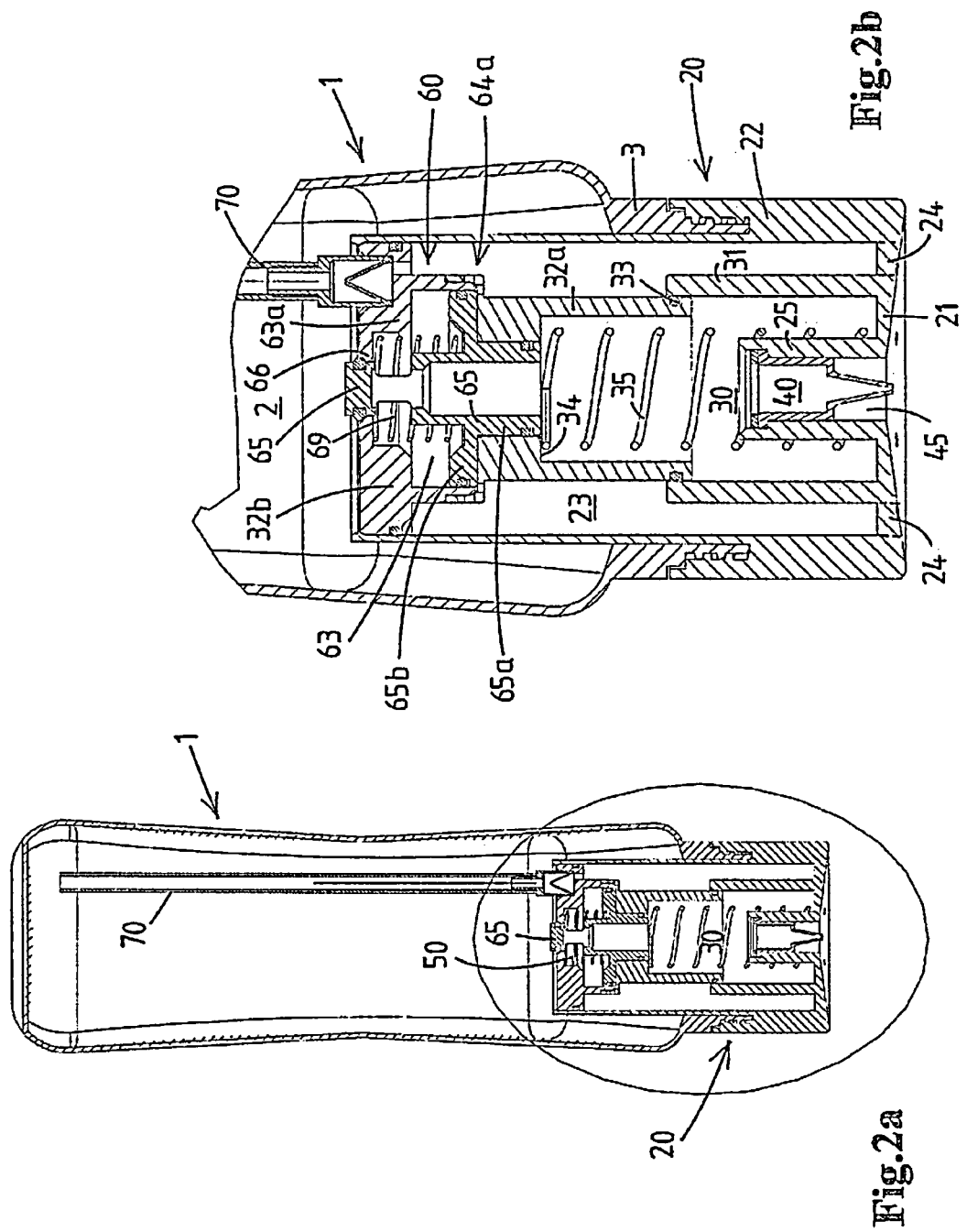

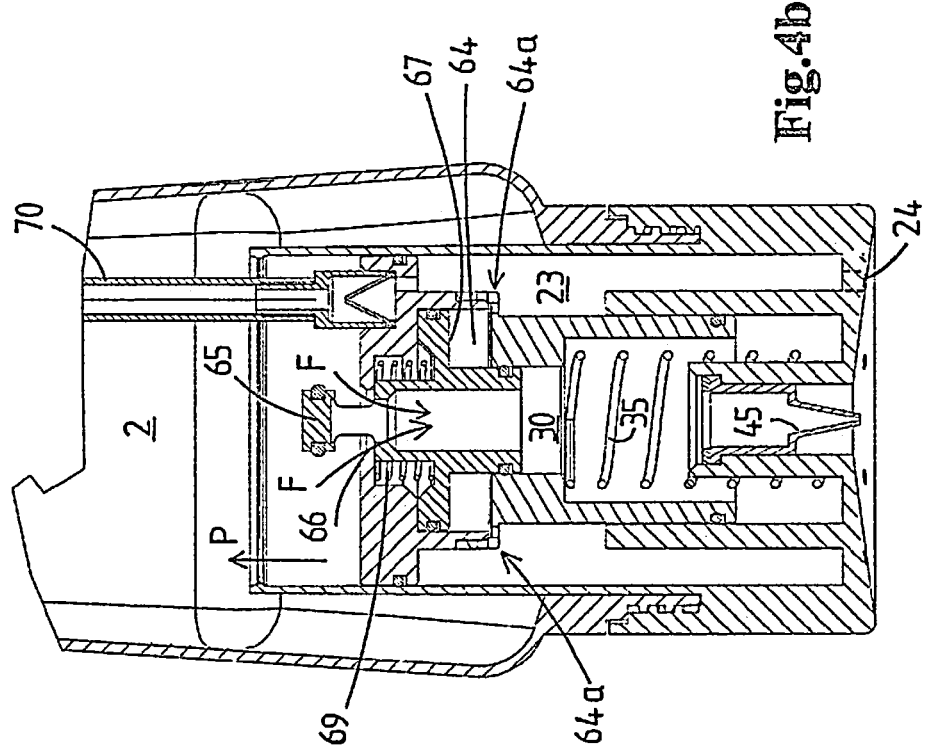
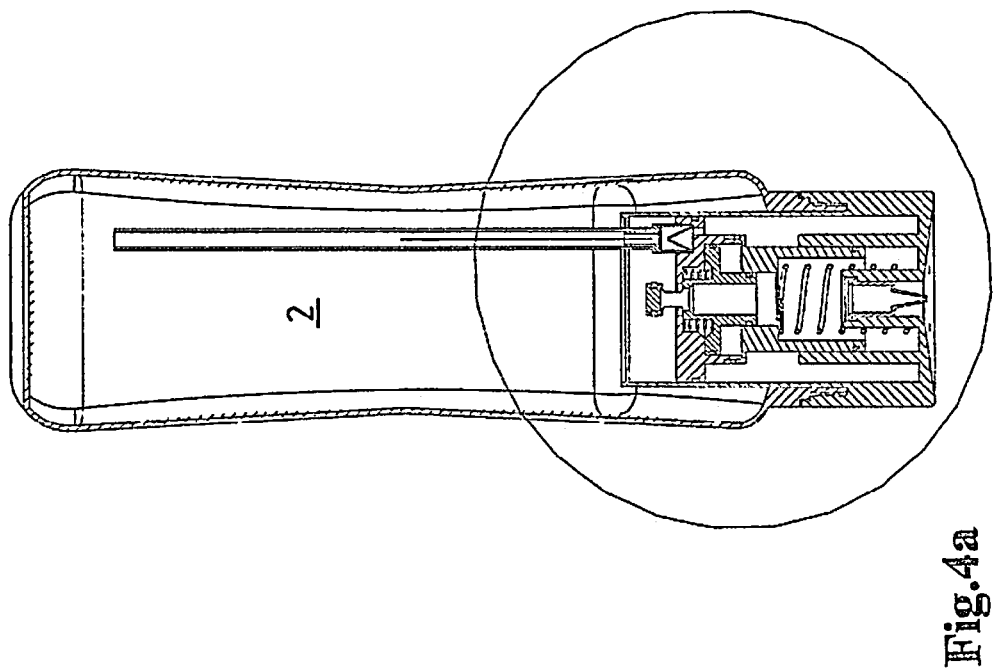
Fig.4a
Fig.4b

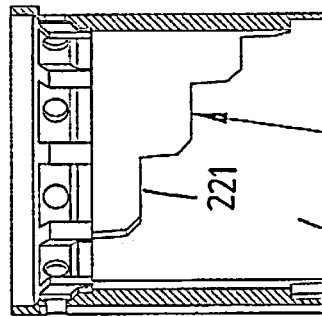
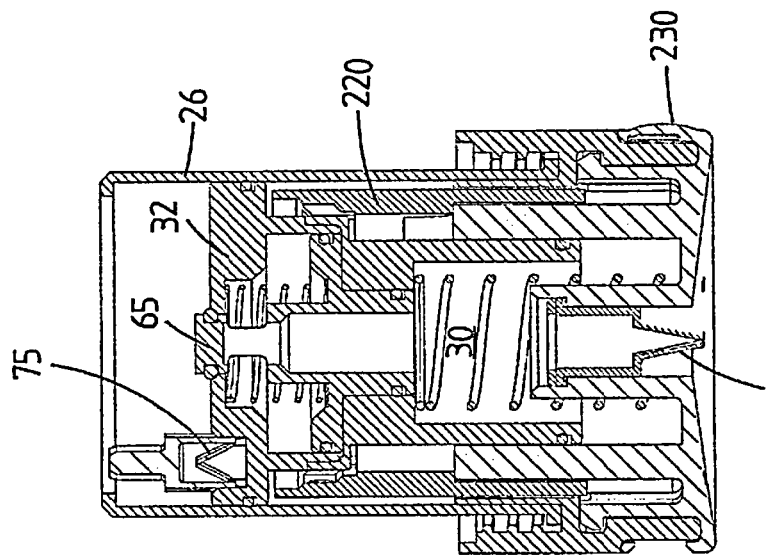
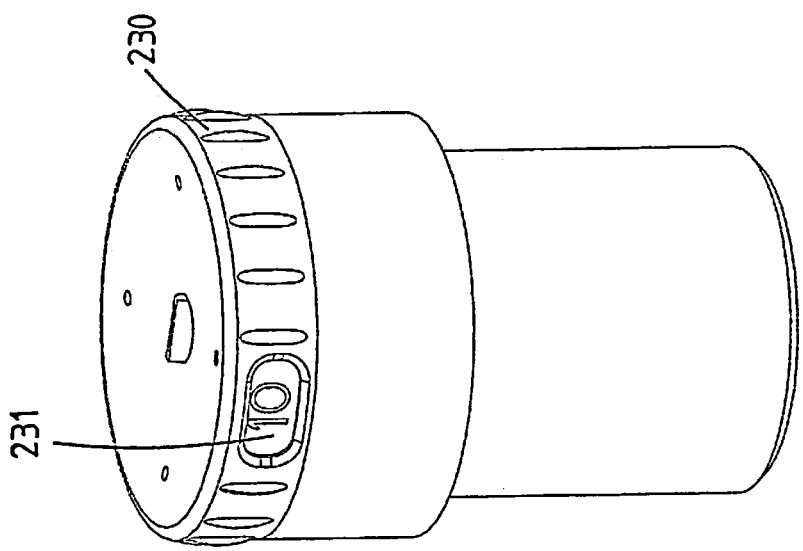

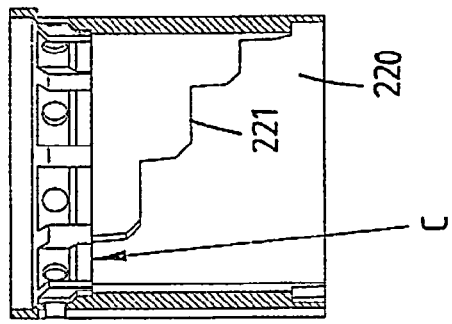
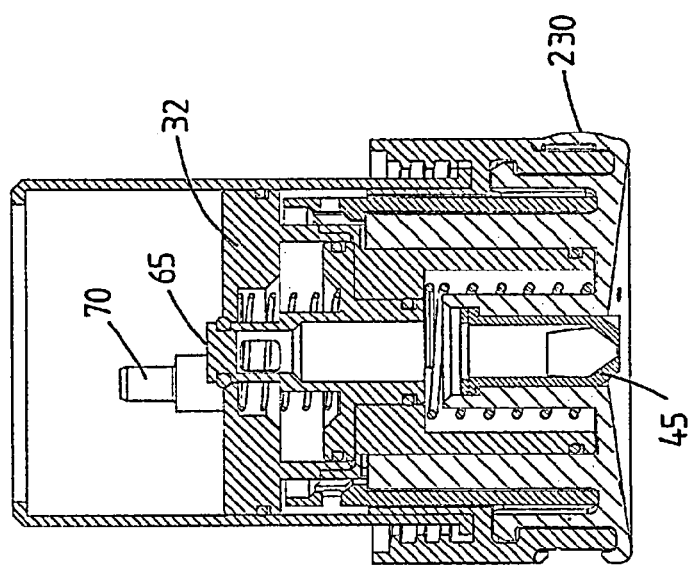
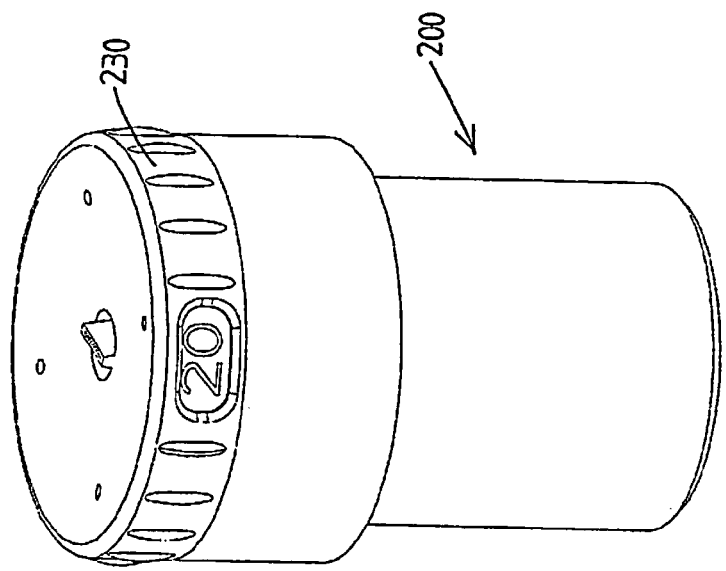
Fig.8c
Fig.8b
Fig.8a

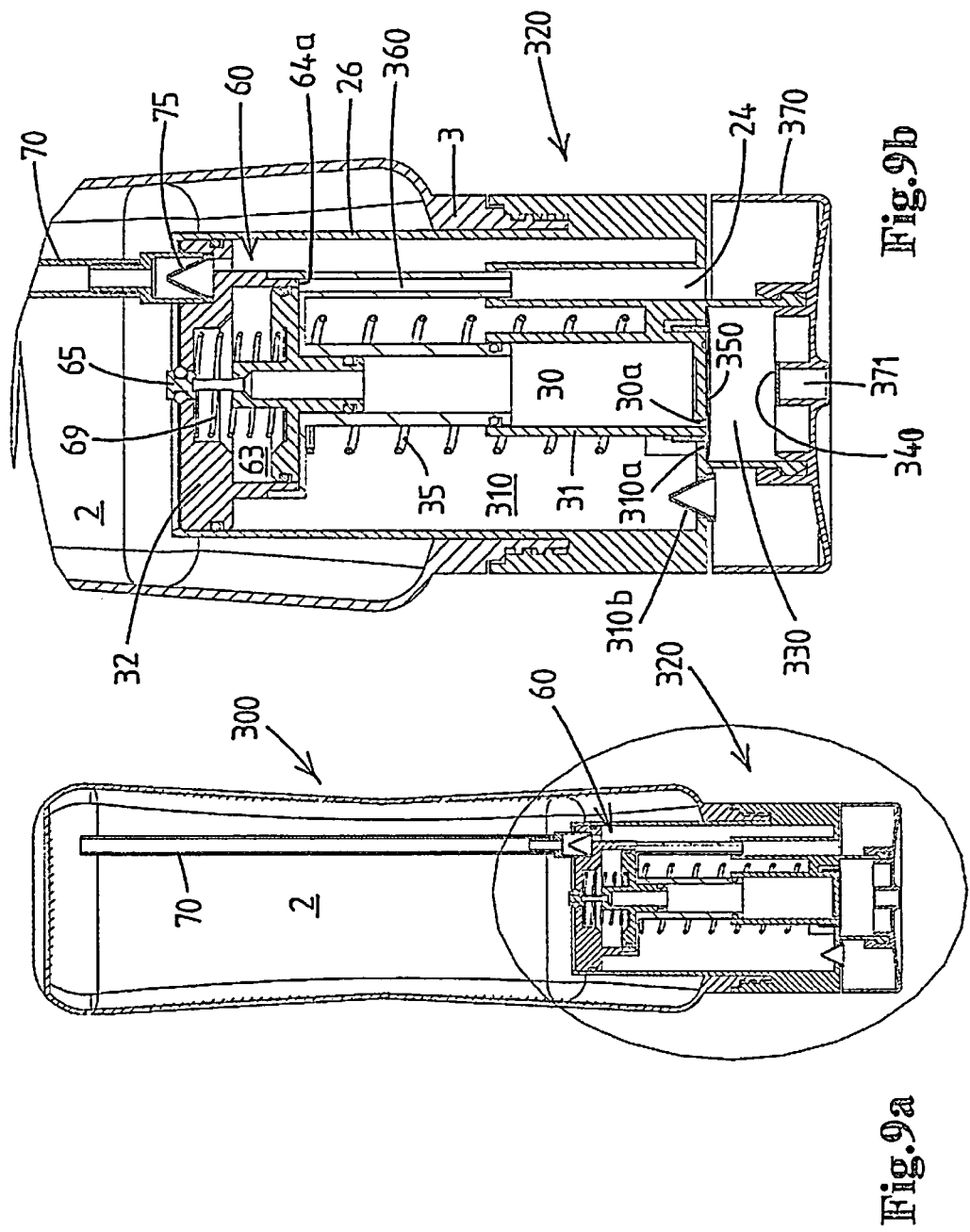

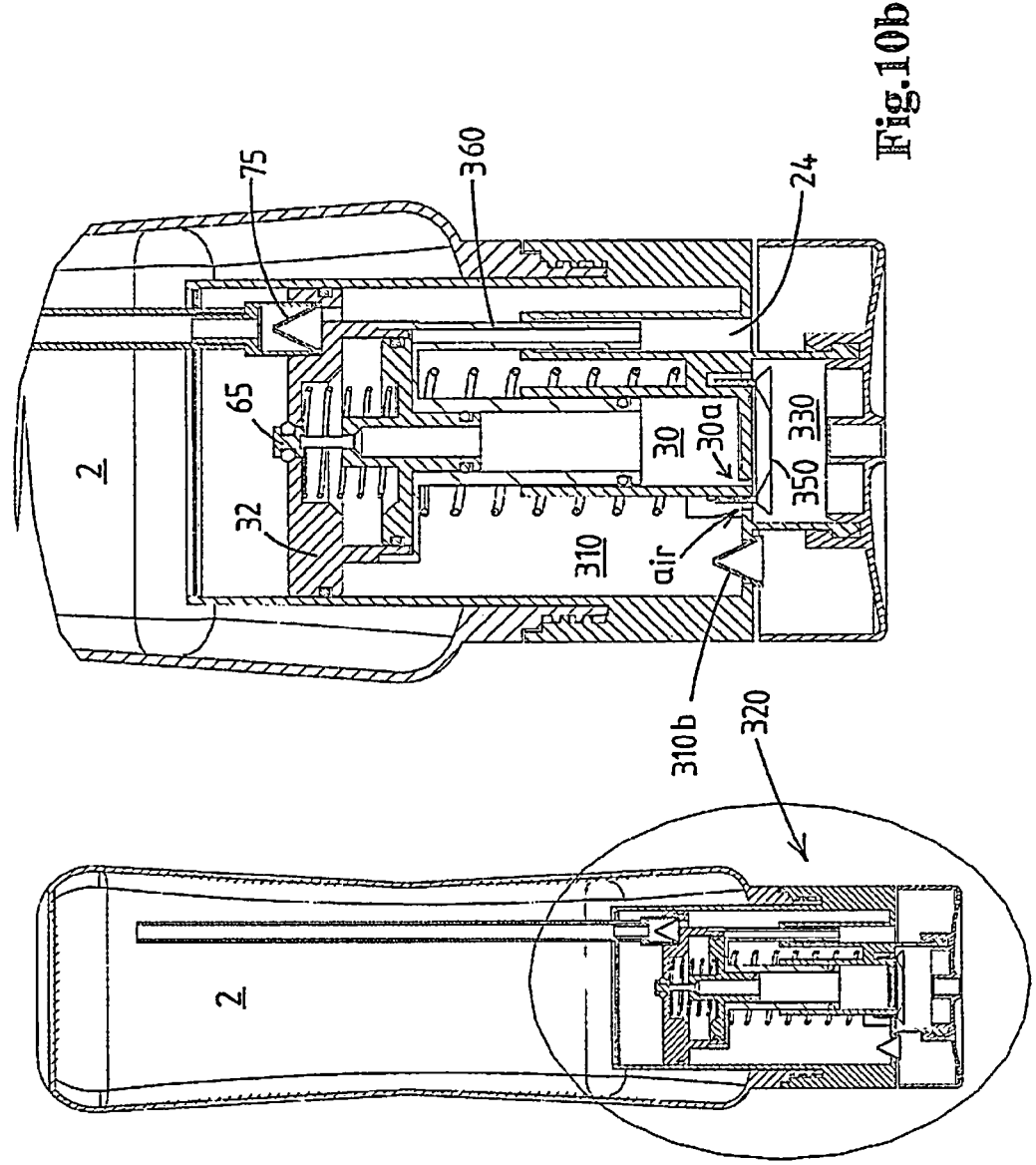

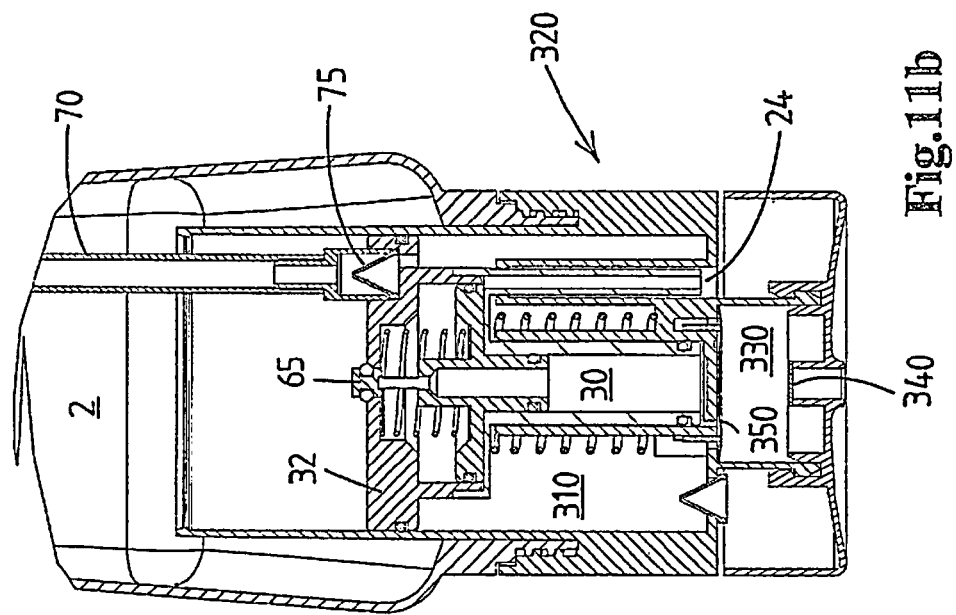
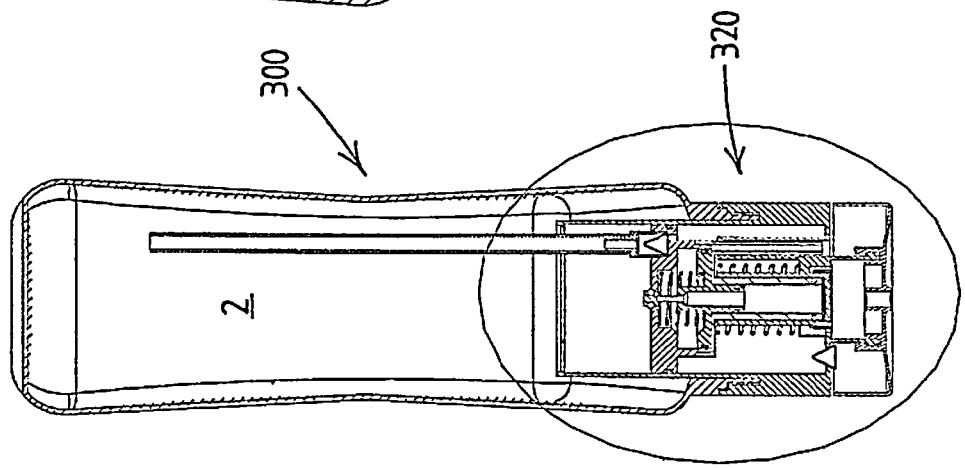
Fig.11a
Fig.11b

CONTAINER WITH A PORTION DISPENSING DEVICE

BENEFIT CLAIMS

This application is a US National Stage of International Application No. PCT/NL2011/050181, filed 15 Mar. 2011, which claims the benefit of both NL 2004416, filed 17 Mar. 2010 and NL 2004912, filed 17 Jun. 2010.

FIELD OF THE INVENTION

The present invention relates to a container with a portion dispensing device for dispensing a product in portions from the container.

In a preferred application the container is a squeezable container, e.g. a plastic squeeze bottle that can be squeezed by hand.

BACKGROUND OF THE INVENTION

In U.S. Pat. No. 6,341,718, in particular with reference to FIGS. 3A-C of said document, a container with a portion dispensing according to the preamble of claim 1 is disclosed. This known container is not entirely satisfactory, e.g. with regard to the uniformity of the portions of product that are dispensed and the dispensing of multiple portions in a short time with container being held upside down during the process.

OBJECTS OF THE INVENTION

It is an object of the present invention to provide an improved container with a portion dispensing device, or at least an alternative for known containers with a portion dispensing device.

It is a further object of the present invention to provide a container with a portion dispensing device that allows for repeated dispensing of uniform portions of product, even when done in a short time.

It is a further object of the present invention to provide a container with a portion dispensing device that allows for setting the volume of the portion that is dispensed.

It is a further object of the invention to provide a container with a portion dispensing device that allows for a setting wherein continuous dispensing of product from the main reservoir is possible.

The present invention provides a container with a portion dispensing device wherein the inlet valve is a underpressure actuated inlet valve, the movable closure member having a first surface in communication with the atmosphere so as to be exposed to atmospheric pressure and a second surface in communication with the variable volume product chamber so as to be exposed to pressure in said variable volume product chamber, the inlet valve being configured such that—when a underpressure is created in the variable volume product chamber as a result of increase of the volume of said chamber due to removal of the increased pressurization of the product in the main reservoir—the movable valve member is caused to move from its seat, thereby allowing flow of product from the main reservoir into the variable volume product chamber.

The invention is based on the insight that an effective opening force can be exerted on the movable closure member, thereby opening the product inlet valve, by the atmospheric pressure acting on one surface of the closure member and the underpressure in the variable volume product chamber acting on another surface of the closure member in the situation that the pressurization of the product in the main reservoir is removed. If the container is a squeeze bottle this will happen when the bottle is no longer squeezed.

Preferred features of the invention are disclosed in the subclaims as well as with reference to one or more exemplary embodiments discussed with reference to the drawings.

The present invention also relates to a portion dispensing device to be mounted on a container for dispensing portions of a product from the container.

The present invention also relates to a method for dispensing portions of a product wherein use is made of a container and/or a portion dispensing device according to the invention.

In a possible embodiment the portion dispensing device is embodied to dispense the product as a foamed or aerated product by causing the product to be mixed with pressurized air in the device.

In another possible embodiment the portion dispensing device is embodied to dispense the product as a spray by atomizing or nebulizing the liquid product, e.g. using a swirl chamber to obtain a fine spray.

For example the product is a cosmetic product (e.g. shampoo, conditioner, gel, lotion, hand or face wash, a skin disinfection product, etc.), a household product (e.g. a detergent, cleaning agent, a dishwashing fluid, a laundry treatment product, an anti bacterial agent), a personal care product, a household chemical, a flower grow enhancing product, a beverage concentrate, a beverage, a food product, a vitamin product, a medicine, a health food product, etc.

The present invention also relates to a container having a portion dispensing device and filled with the product to be dispensed.

The present invention also relates to a method for dispensing a product, wherein the product is dispensed from the container with the portion dispensing device, e.g. by squeezing the container body.

BRIEF DESCRIPTION OF THE DRAWINGS

In the drawings:

FIG. 2A shows in cross-section the container of FIG. 1 in inverted dispensing position, FIG. 2B shows on a larger scale the portion dispensing device of FIG. 2A, FIG. 4A shows the container with portion dispensing device of FIG. 2 in a different operating phase, FIG. 4B shows on a larger scale the portion dispensing device of FIG. 4A, FIG. 9A shows in cross-section a fourth example of a container with a portion dispensing device according to the invention in preferred inverted dispensing position, FIG. 9B shows on a larger scale the portion dispensing device of FIG. 9A, FIG. 10A shows the container with portion dispensing device of FIG. 9 in a different operating phase, FIG. 10B shows on a larger scale the portion dispensing device of FIG. 10A, FIG. 11A shows the container with portion dispensing device of FIG. 9 in a different operating phase, FIG. 11B shows on a larger scale the portion dispensing device of FIG. 11A.

DETAILED DESCRIPTION OF PREFERRED EMBODIMENTS

A first example of a container with portion dispensing device according to the invention will now be explained with reference to FIGS. 1-4.

The container 1 has a container body with a main reservoir 2 for storage of a fluid product, e.g. a liquid, gel, or paste, e.g. a product as cited above.

Preferably the container 1 is shaped and dimensioned to be hand held.

Figure 1:
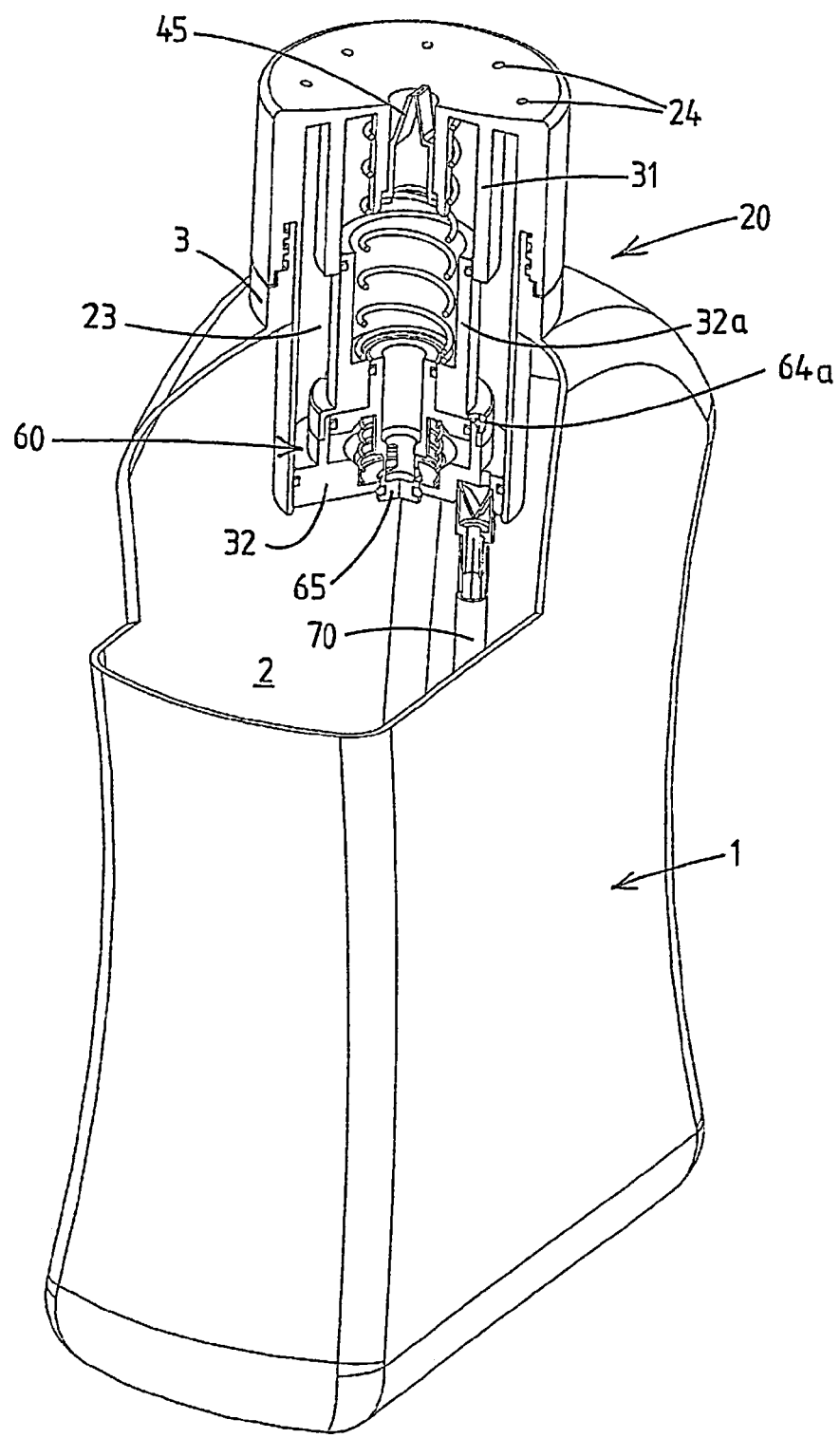
FIG. 1 shows a first example of a container with a portion dispensing device according to the invention.
Figure 3B:
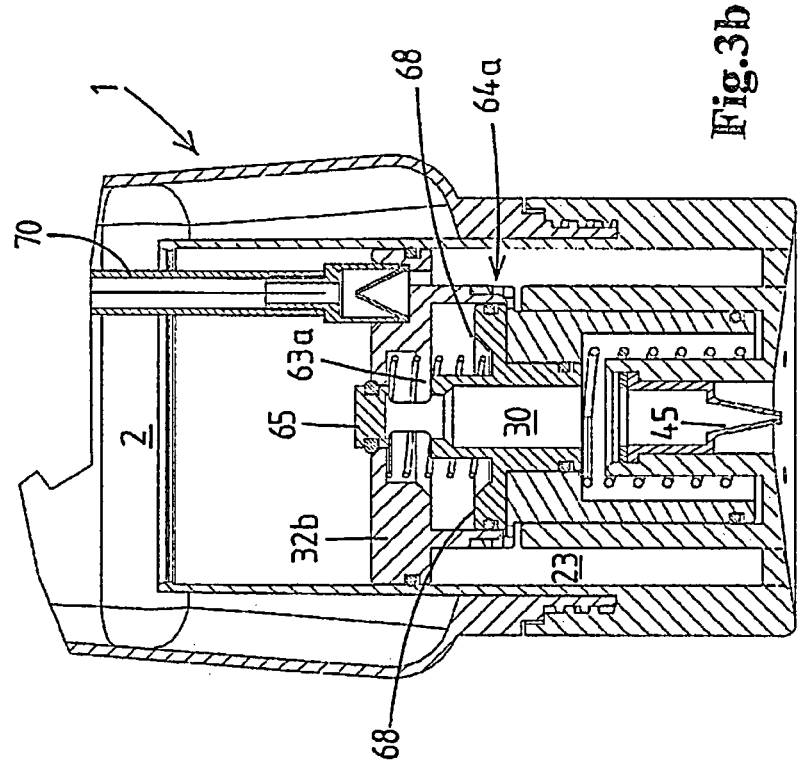
FIG. 3B shows on a larger scale the portion dispensing device of FIG. 3A.

Preferably the container 1 is to be held in inverted position (as shown in FIGS. 1-3) when product is to be dispensed from the container.

As is preferred the container body 1 is deformable to pressurize the product in the reservoir 2 and to cause the dispensing of a portion of the product, most preferably by squeezing the container body or part thereof by hand, most preferably when the container is held by the user in inverted dispensing position. In an alternative the container e.g. comprises a deformable wall portion whereas other portions of the container wall are rigid. In yet another alternative the container includes e.g. a movable piston element to pressurize the product in the main reservoir. The container 1 could be arranged in a dispensing machine, that is manually operated or motorized.

As is preferred the wall material of the container 1 is preferably of plastic, e.g. as a blow moulded bottle.

As is preferred the container body wall material has shape restoring properties so that upon release of the compression by the user, the container returns to its original shape. Most preferably the container 1 is a plastic squeeze bottle.

In another embodiment the container body could be embodied as a collapsible bag, e.g. in a bag-in-box packaging.

As is preferred the body of the container 1 includes an integral neck 3 protruding outwardly from the container body 1.

A preferred embodiment of a portion dispensing device 20 is provided.

As is preferred the portion dispensing device 20 is fitted on the neck 3 of the container, here—as is preferred—by a screw connection. A bayonet connection or other quick-connect coupling can also be envisaged. If desired the connection can be permanent, e.g. a permanent snap fit, e.g. to prevent refilling of the container.

The device 20 includes a variable volume product chamber 30 and associated variable volume product chamber restoring means.

In this first example the variable volume product chamber 30 is delimited by a cylinder 31 and a piston 32 that is reciprocable in the cylinder 31. Clearly other designs are also possible, e.g. the chamber 30 being embodied as a bellows. Preferably the cylinder 31 and piston 32 are plastic components.

A restoring spring 35 is provided here to act as variable volume product chamber restoring means. The spring 35 urges the variable volume product chamber 30 to its maximum volume, here by biasing the piston 32 to a limit position. Here the spring 35 is arranged inside the chamber 30. As is practical the spring 35 here is a coil spring. The spring 35 could also be arranged outside of the chamber 30. The spring could also be incorporate in the piston, e.g. as a spring part of the piston, e.g. the piston and spring being moulded from plastic.

The variable volume product chamber 30 has a product outlet 40 for passing product from the variable volume product chamber 30. An outlet valve 45 is associated with said outlet 40. As is preferred the outlet valve 45 is a self closing valve, e.g. a check valve. A duckbill valve is shown in this example. As is preferred the outlet valve 45 automatically opens upon suitable pressurization of product in the chamber 30, so that said product flows through said valve 45. As is preferred the valve 45 closes automatically upon completion of discharge of product from the chamber 30 so as to avoid air or product being sucked into the chamber 30.

In this example, as in a practical embodiment of the inventive container, the product is directly discharged from the outlet valve 45, so that no further portion of the device is in contact with the dispensed product other than the valve 45. However, other embodiments are also possible. For example the device 20 can be embodied to dispense the product as a foam, e.g. including one or foam generating members, preferably downstream of the outlet valve of chamber 30. The device 20 can also include, or be connected to, a dispensing tube or other dispensing or applicator fitment, e.g. a brush fitment, e.g. for cosmetic products.

The chamber 30 also includes a product inlet 50 that is in communication with the main reservoir 2. An inlet valve 60 is associated with said product inlet 50. The inlet valve 60 governs the entry of product from the main reservoir 2 into the chamber 30.

In general the variable volume product chamber 30 has a volume that is reduced upon increased pressurization of product in the main reservoir 2 of the container 1. The volume of chamber 30 is increased, at least aided by the variable volume product chamber restoring means (here spring 35), when the increased pressurization of the product in the main reservoir 2 of the container is removed.

In general the inlet valve 60 is configured to close the product inlet 50 to the chamber 30 upon increase of pressurization of the product in the main reservoir 2 so that product is then passed from the chamber 30 via the product outlet 40. The inlet valve 60 is also configured to open the product inlet 50 upon removal of the increased pressurization of the product in the main reservoir 2 so as to allow for the flow of product from the main reservoir 2 into the variable volume product chamber 30.

As is practically preferred the inlet valve 60 is arranged in the piston 32 of the variable volume product chamber so as to move with the piston 32.

The inlet valve 60 is an underpressure actuated inlet valve 60. The valve 60 comprises a movable valve member 65 and an associated seat 66 for the movable valve member 65. Here the seat 66 is integral with the piston 32 of the chamber 30.

The seat 66 faces the main reservoir 2 so that increased pressurization of product in the main reservoir 2 presses the movable valve member 65 onto the seat 66. FIGS. 2A, B show the inlet valve 60 in closed position.

The movable valve member has a first or external surface 67 in communication with the atmosphere so as to be exposed to atmospheric pressure and has a second or internal surface 68 in communication with the variable volume product chamber 30 so as to be exposed to pressure in said variable volume product chamber.

The inlet valve 60 is configured such that—when an underpressure is created in the variable volume product chamber 30 as a result of increase of the volume of the chamber 30 due to removal of the increased pressurization of the product in the main reservoir 2—the movable valve member 65 is caused to move from its seat, thereby opening the inlet valve 60 and allowing flow of product (arrows F) from the main reservoir 2 into the variable volume product chamber 3. This is illustrated in FIGS. 4A, B, wherein the piston moves in direction of arrow P to increase the volume of the chamber 30. A more detailed explanation will be given below.

In the example shown in FIGS. 1-4 the inlet valve 60 comprises an inlet valve body 61 that is integral, here monolithic, with the piston 32, preferably made of plastic material.

The body 61 has a bore in which the movable valve member 65 is reciprocable. The movable valve member 65 sealingly engages an inner surface of the bore and delimits in the bore an underpressure space 63 and an atmospheric pressure space 64.

The inlet valve body 61 has a passage 64a connecting the atmospheric pressure space 64 to the atmosphere and a passage 63a connecting the underpressure space 63 with the variable volume product chamber 30.

In this example the movable valve member 65 comprises a tubular main body portion 65a and an annular flange 65b surrounding said main body portion. The periphery of the annular flange 65b sealingly engages the inner surface of the bore, here a sealing ring being provided.

As is preferred the inlet valve 60 comprises an inlet valve restoring means that provides a restoring force urging the movable inlet valve member 65 towards its seat 66. Here a spring 69 is provided as restoring means, the spring 69 being arranged between the valve body 61 and the movable valve member 65.

In order to allow air into the main reservoir 2 after a portion of product has been dispensed, it is envisaged to have a vent passage, preferably a vent passage that does not extend through the chamber 30 but bypasses the variable volume product chamber 30. This avoids undesired mixing of the product with air or entry of air into the chamber 30 that would disturb the proper dispensing of a portion of product.

As is preferred the vent passage includes a straw 70 that is connected at one end to the piston 32 of the chamber 30 and that extends into the container towards the bottom end thereof. As is preferred a self-closing valve 75, here a duckbill valve, is associated with the vent passage that allows entry of air into the reservoir 2 yet prevents exit of air and product via the vent passage.

In this example the portion dispensing device has a body with a dispensing wall or top wall 21 having a valved dispensing opening therein with outlet valve 45, here centrally arranged in the wall 21 as is preferred.

The body of the device 20 here includes a peripheral skirt 22 that is integral with the top wall 21 and is provided with suitable screw thread or other connector means connecting the body of the device 20 to the container, here screwed onto the neck 3.

In this example the chamber 30 includes cylinder 31 that is integral with the body of the device and concentrically with the skirt 22. A space, here an annular space 23, between the chamber 30 and the skirt 22 is in open communication with the atmosphere, here via one or more openings 24 in the body of the device 20, here in the wall 21.

In this example a tubular portion 25 of the body of the device 20 is concentrically arranged within the cylinder 31 and integral with the wall 21, said tubular body portion housing the outlet valve 40. Also the tubular portion 25 here, as is preferred, serves to support an end of the spring 35.

The piston 32 here includes a cylindrical portion 32a that slidingly cooperates with the cylinder 31. As is preferred the cylindrical portion 32a is provided with a sealing ring 33 that cooperates with the cylinder 31.

The piston 32 here forms a shoulder 34 or support for supporting the other end of the spring 35. The shoulder 34 here extends annularly around a bore in the piston 32 in which tubular portion 65a of the inlet valve is reciprocably received.

As indicated the passage 64a serves to bring the space 64 in open communication with the atmosphere, here through said passage 64a (as is preferred multiple passages 64a are provided distributed around the circumference of the piston) being in open communication with the space 23.

In this example the space 23 is partly delimited by a cylindrical portion 26 of the body of device 20.

In this example the cylindrical portion 26 extends into the neck of the container, here—as is less preferred—into the container body beyond the neck of the container. The piston 32 has a body portion 32b, here at the end facing the reservoir 2, that is slidingly received in said portion 26 in a sealing manner Thus the space 23 is partly delimited also by the portion 32b of the piston.

As is preferred the vent passage extends through said portion 32b of the piston 32 to connect the straw 70 to the space 23.

The operation of the container can be readily understood from the FIGS. 1-4.

In FIG. 2 the container 1 with dispensing device 20 is shown in at rest situation. It is here assumed that the chamber 30 is filled with product due to earlier operation of the container with dispensing device. In this at rest position (which can also be with the device 20 on the top end during storage of the container) the spring 69 ensures that the inlet valve 60 is closed. So no product can flow back from the chamber 30 into the main reservoir 2 and vice versa.

For dispensing of a portion of product it is envisaged that the container 1 is held in inverted position, as shown in FIGS. 2-4.

Then the user squeezes the container 1 in order to dispense a metered portion of the product from chamber 30. The metered portion here basically corresponds to the volume of product that is expelled from the chamber 30 without new product flowing into said chamber 30.

Figure 3A:
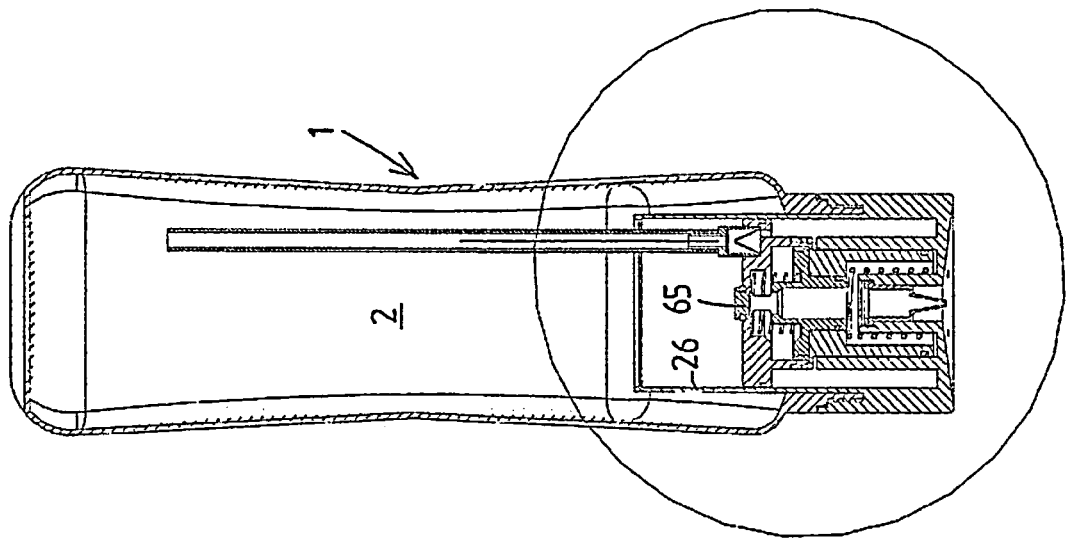
FIG. 3A shows the container with portion dispensing device of FIG. 2 in a different operating phase.

Squeezing the container 1 leads to pressurization of the product in the main reservoir 2 of container 1. The pressurized product in the reservoir 2 presses against the piston 32 which then moves (against the spring 35) towards the compressed position of the chamber 30. This situation is shown in FIGS. 3A, B.

The product pressure also acts on the movable valve member 65 and forces it against it seat 66, so that the inlet valve 60 remains closed during the expulsion of product from the chamber 30 via the outlet valve 45. As mentioned this outlet valve 45 automatically opens due to pressure of the product in the chamber 30. Once the piston 32 reaches its limit position continued squeezing of the container does not lead to further dispensing of product as the inlet valve 60 remains closed. So the dispensing of the portion is then completed.

The user will now stop squeezing the container 1. The piston 32 of the chamber 30 will now start to move towards its start position as shown in FIGS. 4A, B. This motion is caused in this example partly by the spring 35 and partly by an underpressure within the reservoir 2 as the venting will not immediately relieve said underpressure in the container. In other designs one of these effects may also suffice to cause this motion of the piston 32.

The motion of the piston 32 causes the effective volume of the chamber 30 to increase. As the outlet valve 45 is automatically closed now, no air can be sucked into the chamber via said valve 45. Therefore an underpressure occurs in the chamber 30.

The valve member 65 is now subjected on one side, exterior surface 67, to the atmospheric pressure and on the other side, interior surface 68, to the underpressure in chamber 30. This causes an effective opening force on the valve member 65 and causes the valve member 65 to move from its seat 66 as shown in FIGS. 4A, B. Now the chamber 30 is in communication with the reservoir 2. The product will now flow into the chamber 30 (as indicated with arrows F) due to the sucking action of the expanding chamber 30, possibly aided by gravity as the container is still held in inverted position.

Finally the position of FIG. 2 is reached again. A dispensing of a further portion may now be effected without the need to change the inverted position of the container into an upright position, simply by squeezing the container body again. There is no need to bring the container in an upright position, with the device on top, between successive discharges of portions.

A second example of a container with portion dispensing device according to the invention will now be explained with reference to FIG. 5.

Figure 5A:
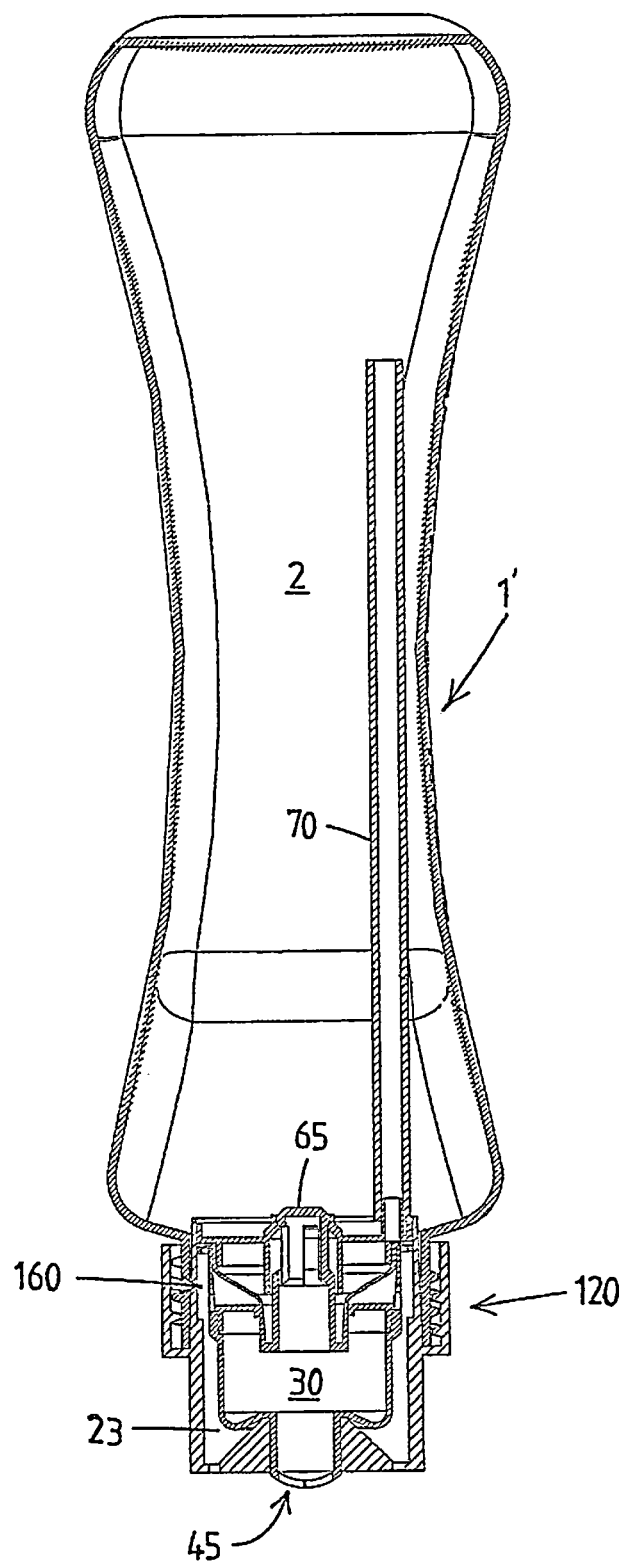
FIG. 5A shows in cross-section a second example of a container with portion dispensing device according to the invention.
Figure 5B:
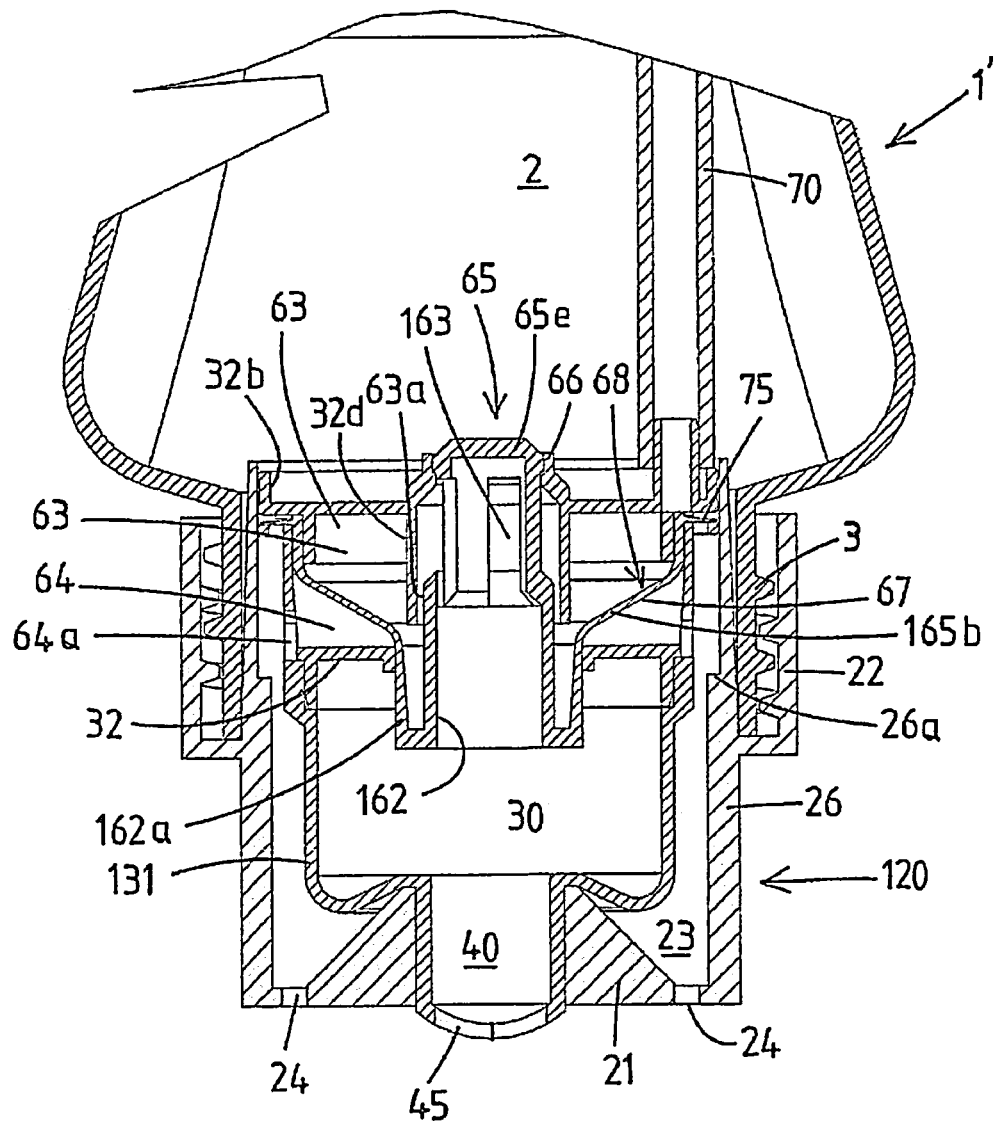
FIG. 5B shows on a larger scale the portion dispensing device of FIG. 5A, FIGS. 6A, B, in perspective view and in cross-section a third example of a portion dispensing device according to the invention, FIG. 6C in cross-section a portion volume setting member of said device of FIGS. 6A, B thereof, FIGS. 7A-C in views corresponding to FIGS. 6A-C the device with a different setting of the volume setting member, FIGS. 8A-C in views corresponding to FIGS. 6A-C the device with yet another setting of the volume setting member.

In FIGS. 5A and 5B parts corresponding to parts identical or similar to parts of the first exemplary embodiment have been denoted with the same reference numeral.

In the embodiment shown here the variable volume product chamber 30 is formed by a flexible bellows 131 instead of a telescopic chamber structure of which an example is shown in FIGS. 1-4.

The bellows 131 is connected to the outlet 40. Here the outlet passage is formed as an integral extension of the wall of the bellows 131. Here, as an optional feature, an outlet valve 45 is integral with the bellows 131.

At the inlet side of the bellows 131, the bellows 131 connects to reciprocable piston 32. The piston 32 includes the inlet 50 into the chamber 30 and an underpressure actuated inlet valve 160.

The piston 32 is reciprocable in the portion dispensing device 120, here in cylindrical part 26 thereof.

The underpressure actuated inlet valve 160 has the same functionality as inlet valve 60, yet is of a different construction.

Here the movable valve member 65 also fits in a seat 66 formed by the piston 32, at the side of the piston 32 facing the reservoir 2 so that pressurizing the product in the reservoir 2 presses the member 65 onto its seat 66.

The movable valve member 65 now is integral with a flexible diaphragm 165b that is at its outer contour connected to the valve body 61 (which is integral with the piston 32 in this example).

The diaphragm 165b defines an underpressure space 63 that is in open communication with the chamber 30 via passage 63a. An exterior surface 67 of the diaphragm 165b is exposed to the atmospheric pressure in space 64 via openings 64a, space 23 and openings 24.

As is preferred the diaphragm 165b itself is embodied to provide a restoring force that urges the valve member 65 towards its seat 66. The use of the diaphragm 165b thus obviates the need for a sliding seal as in the valve 60 and in this preferred embodiment with restoring properties also obviates the need for a separate inlet valve restoring spring. If desired such a spring may nevertheless be provided.

In more detail, as is preferred, the inlet valve diaphragm 165b connects at its inner contour to double-walled section 162a of a tubular portion 162 that is in open communication with the chamber 30. The tubular portion 162 includes a section with one or more ports 163 and terminates at the closure portion of movable valve member 65 which cooperates with the seat 66.

The piston 32 here has a tubular portion 32d into which the tubular portion 162 extends. One or more passages 63a are present between these portions 162, 32d to provide open communication between the space 63 and the chamber 30 via ports 163. The tubular portion 162 is more rigid then the flexible diaphragm 165b.

The double-walled section 162a sealing slides in an opening of a further wall portion 32e of the piston 32, so that the chamber 30 is separated from the atmospheric pressure space 64.

It will be appreciated that operation of inlet valve 160 is similar to the operation of inlet valve 60.

The operation will now be explained shortly under the assumption that the chamber 30 is filled with product and the container 1' is held in inverted position as in FIG. 5. When the container is compressed the pressurized product in reservoir 2 acts on the piston 32 which will then slide in the housing of device 120 along wall 26. The flexible bellows 131 is compressed and the chamber 30 reduces in size. The product therein is then expelled via outlet valve 45. During the expulsion of product from chamber 30 the inlet valve 160 remains closed due to product pressure on the surface 65e facing the reservoir 2 of said movable valve member 65 which is then exposed to the increased product pressure.

If the piston 32 reaches its limit position, here defined by a stop surface 26a, the dispensing of a portion is completed.

Then the user will stop squeezing the container. The temporary underpressure in reservoir 2 and/or the restoring force of the bellows 131 cause the piston 32 to start to move to its starting position. The underpressure caused thereby in chamber 30 results in an effective force on the diaphragm 165b that moves the valve member 65 from its seat 66. Then product can flow into the chamber 30 from the reservoir 2 until the chamber 30 is filled and the piston 32 returned to its starting position. The restoring property of the diaphragm 165b will then aid to close the inlet valve 160.

As explained with reference to the first and second exemplary embodiments the inventive container with portion dispensing device allows to dispense a metered portion of product from the container, e.g. by simply squeezing the container until the portion is dispensed after which the dispensing stops even if the squeezing would be continued.

It is envisaged as an optional feature that the size of the portion to the dispensed can be set by the user prior to dispensing the portion. An example thereof will now be illustrated with reference to FIGS. 6-8 wherein a portion dispensing device 200 according to the invention is shown. It will be appreciated that this device 200 can be fitted on a suitable container, e.g. screwed onto the neck of a container as shown in FIGS. 1-5.

In the device 200 many parts can be recognized that are identical or similar in functionality to parts in the exemplary embodiments above. These parts will not be discussed here again and referral is made to the above description thereof.

The major difference is the additional feature of the setting of the size of the portion. To achieve this a portion volume setting member 220, as an example of generally cylindrical shape, is arranged between the piston 32 and the housing or main body of the device 200.

Figure 6C:
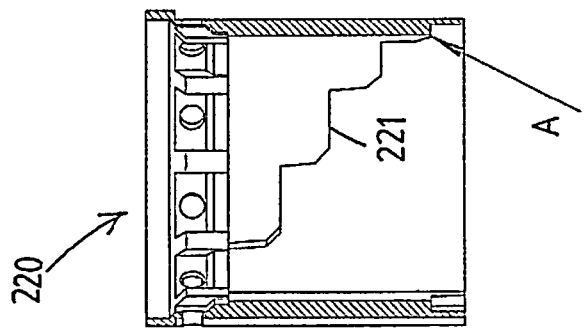

In this example the cylindrical member 220 includes a stepped inner stop face 221, here on its inner surface, e.g. as shown in FIGS. 6C, 7C and 8C.

The stepped inner stop face 221 is adapted to cooperate with a corresponding stop face on cylinder 31. However the cylinder 31 here forms part of a rotary user operable portion 230 of the device 200. Depending on the user selected angular position of said user operable portion 230 a selection is made between multiple distinct maximum strokes of the piston 32.

Thereby the user can pre-select the volume of the portion to be dispensed from the filled chamber 30.

Figure 6B:
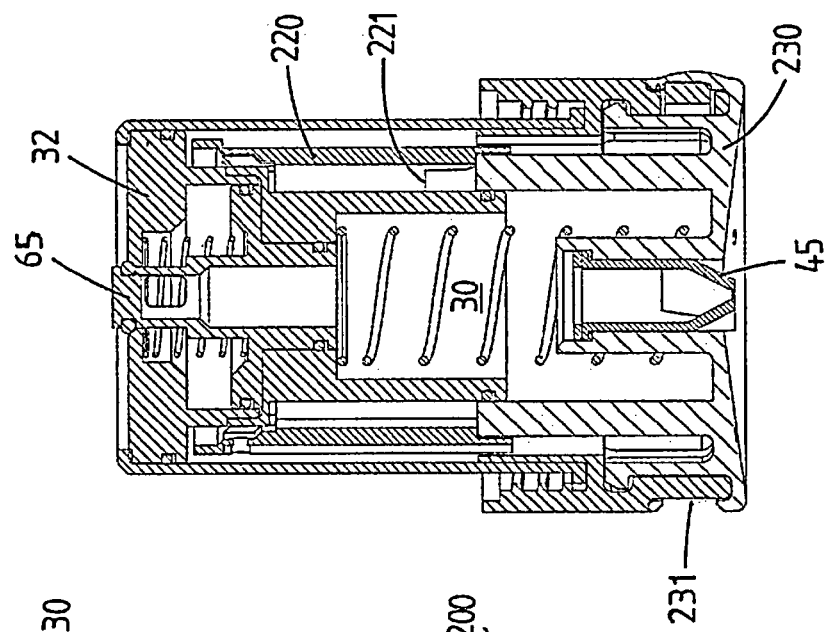
Figure 6A:
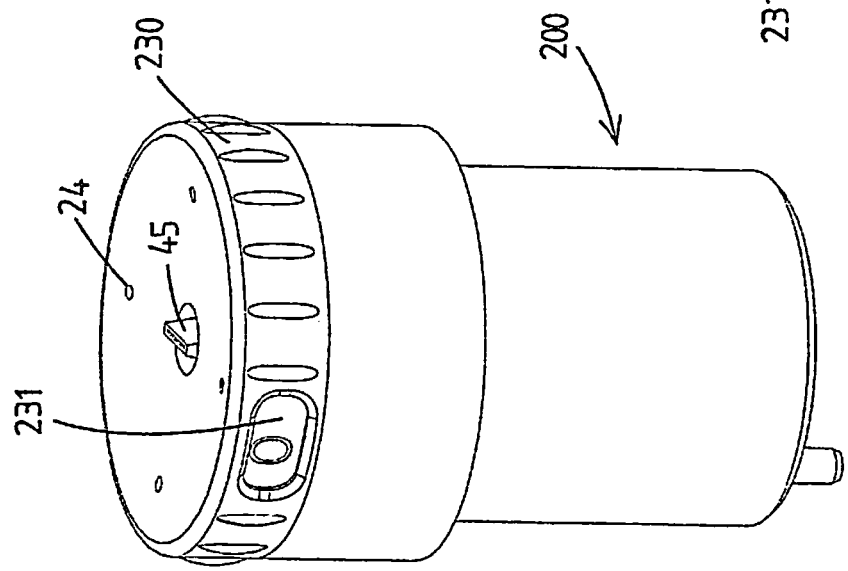
Figures 12A, 12B:
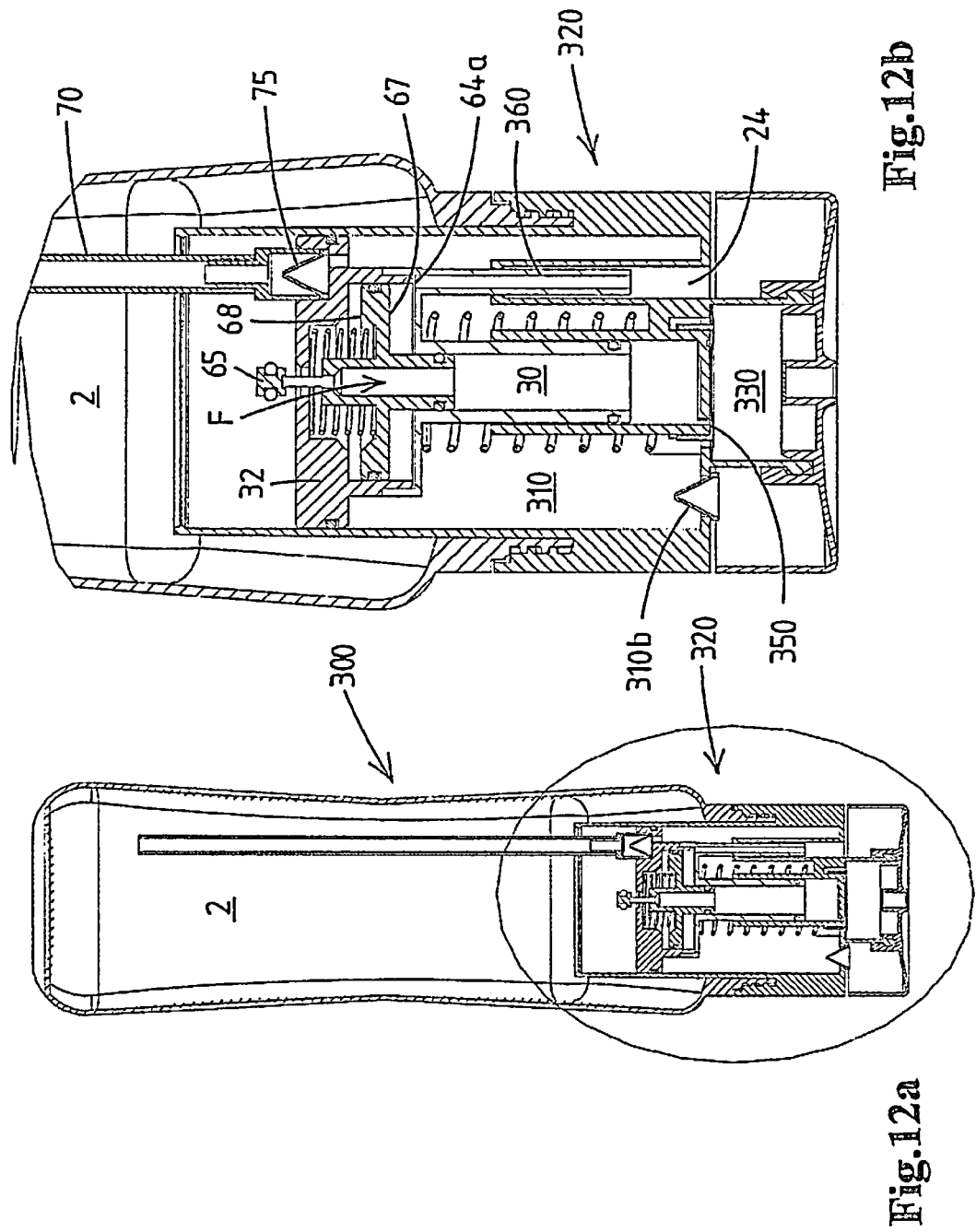
FIG. 12A shows the container with portion dispensing device of FIG. 9 in a different operating phase.
FIG. 12B shows on a larger scale the portion dispensing device of FIG. 11A.

As is preferred the portion volume setting member provides for a locking or zero-setting of the portion device 20. In this example a locking of the piston 32 in its starting position so that no product is expelled at all if the product in the main reservoir 2 is pressurized. This situation is shown in FIG. 6 where the arrow A indicates the locking step in face 221 which is then active. As an alternative, e.g. in absence of this portion volume setting, a distinct user operable locking device may be provided that prevents compression of the variable volume product chamber.

As is preferred the device 200 includes a visual indicator, here the zero in window 231 of portion 230, that the device 200 is locked.

It will be appreciated that the possibility for the user to lock the piston 32 may be helpful for storage and/or transport of the container with the portion dispensing device.

A tamper-evident arrangement can be envisaged in combination with the locking means for the piston 32, e.g. to disclose visibly and/or audible that the locking means are unlocked for the first time, e.g. when a new container is first used by a consumer.

FIG. 7 illustrates the situation wherein the user has selected a portion size indicated with numeral 10 in window 231 of the rotary member 230. The FIG. 6B shows the piston 32 when the dispensing of the chosen portion is completed. Now the step indicated with arrow B is active to block further motion of the piston 32 in dispensing direction.

FIG. 8 illustrates the situation wherein the user has selected a larger portion size indicated with numeral 20 in window 231 of the rotary member 230. Now the piston 32 has completed its largest possible stroke and thus the maximum size portion has been dispensed.

In an embodiment not shown in the drawings it is envisaged that the product inlet valve, in addition to its underpressure actuation as disclosed herein, can also be actuated by a secondary mechanical actuation to open and/or keep open the valve. For instance as a variant of device 200 a setting or a further setting could be envisaged of the member 220, wherein a portion of the body of the device, e.g. portion 25, mechanically contacts the movable valve member 65 to open the inlet valve 60, e.g. when the piston 32 is in its most retracted position, e.g. so that continuous dispensing is possible by continuing to squeeze the container.

A fourth example of a container with portion dispensing device according to the invention will now be explained with reference to FIGS. 9-12.

In FIGS. 9-12 parts corresponding to parts identical or similar in functionality to parts of one or more of the preceding exemplary embodiments have been denoted with the same reference numeral.

The fourth example discloses a portion dispensing device wherein a portion of product is dispensed as foam caused by mixing the portion of product with air within the dispensing device. The portion of product could also be aerated by mixing the product with air, e.g. a gel into which air is mixed during dispensing, e.g. as a cosmetic product.

In this embodiment the dispensing device 320 fitted on the container 300 (here a squeeze bottle as is preferred) comprises a variable volume air chamber 310 as part of an air pump in the device 320, said air pump being operated by pressurization of product in the main reservoir 2 (here by squeezing the bottle). Upon squeezing the container 300 the air pump causes air to be pressurized. This pressurized air is fed to a mixing arrangement wherein said air is mixed with the portion of product that emerges from the variable volume product chamber 30. So a portion of product in foamed or aerated condition is dispensed from the container 300.

As is preferred a single piston 32 is common for both the variable volume air chamber 310 and the variable volume product chamber 30 so as to limit the number of parts of the device 320.

As is preferred the air chamber 310 and the product chamber 30 are concentrically arranged, most preferably the air chamber 310 surrounding the product chamber 30.

Many mixing arrangements are known to obtain a suitable mixing of air with product from chamber 30 and can be incorporated in the device 320. In this example a mixing and dispensing passage 330 is provided into which the air and product enter and are mixed. Foam forming can be enhanced by one or more sieves 340 or similar in said passage 330.

The embodiment shown here a combined air and product chambers outlet valve 350 is provided at the outlet of the air chamber 310 and the product chamber 30. As an alternative separate outlet valves can be provided. FIGS. 10A and B illustrate that said valve 350 opens as a consequence of pressurization of the air and the product in the chambers 310 and 30 respectively. The valve 350—as is preferred—is self-closing, e.g. embodied as a resilient member overlying ports 30a and 310a to the chambers 30 and 310.

An air chamber inlet valve 310b is present, here embodied as a self-closing valve as is preferred.

As a preferred feature the vent passage for main reservoir 2 extends through the air chamber 310 of the air pump in device 320. This can be seen as valve 75 is in communication with the air chamber 310.

In this embodiment an atmospheric pressure duct 360 is provided to bring the atmosphere in communication with the external surface of the underpressure actuated inlet valve of the product chamber 30. In this example said duct 360 is a telescopic duct, one portion being integral with piston 32 and the other portion with the housing of the device 320.

In this example the dispensing passage 330 is formed by a cap member 370 fitted on the housing of the device 320. The cap 370 has a dispensing opening 371, a sieve 340 (as preferred embodiment of the cap) being arranged in front of the dispensing opening 371.

In this example a gap between the cap 370 and the housing of device 320 allows for entry of air to the air chamber 310 and the opening 24 of duct 360.

The operation of the container 300 with foamed product portion dispensing device 320 will readily follow from the FIGS. 9-12 wherein various operating states are shown in detail.

In FIGS. 9A, B the container 300 and device 320 are shown in an inverted dispensing position without the container 300 being squeezed. The product chamber inlet valve 65 is closed, biased by spring 69 onto its seat in piston 32. The chamber 30 is filled with product and air is present in chamber 310.

Upon squeezing the container 300 the product in main reservoir 2 is pressurized. This causes the piston 32 to move downwards. Both the air chamber 310 and the product chamber 30 are now reduced as to their effective volume and air and product are pressurized. This causes the valve 350 to open, as shown in FIGS. 10A, B.

Air and product now enter the passage or chamber 330 in a manner so as to cause the formation of a foamed product, e.g. a soap, shampoo, detergent, or other foaming product. As is known one or more sieves 340 (e.g. in series) enhance the formation of suitable foam.

Continued motion of the piston 32 downwards causes the portion of product to be expelled from the chamber 30 and a foamed portion of product to be dispensed from the opening 371. Finally the piston 32 reaches its limit position and dispensing is stopped.

Now the squeezing of the container 300 is stopped as well. Due to shape restoring properties of the container wall the piston 32 returns to its original position. The product inlet valve 65 opens in the same manner as explained herein before as the atmospheric pressure acts on the external surface 67 of the movable valve member via duct 360.

Air to make up for the discharged product is also sucked into main reservoir 2 via the chamber 310 and the valve 75 and straw 70. If desired the venting may take another route, preferably separated from the product chamber 30 as explained before.

In an alternative foaming embodiment of the device 320 the air chamber 310 is absent and air under pressure is directly retrieved from the top side of the main reservoir as the container is squeezed in inverted dispensing position. For example an air straw is provided that connects to a mixing means downstream of the outlet valve of the variable volume product chamber.

Figure 13:
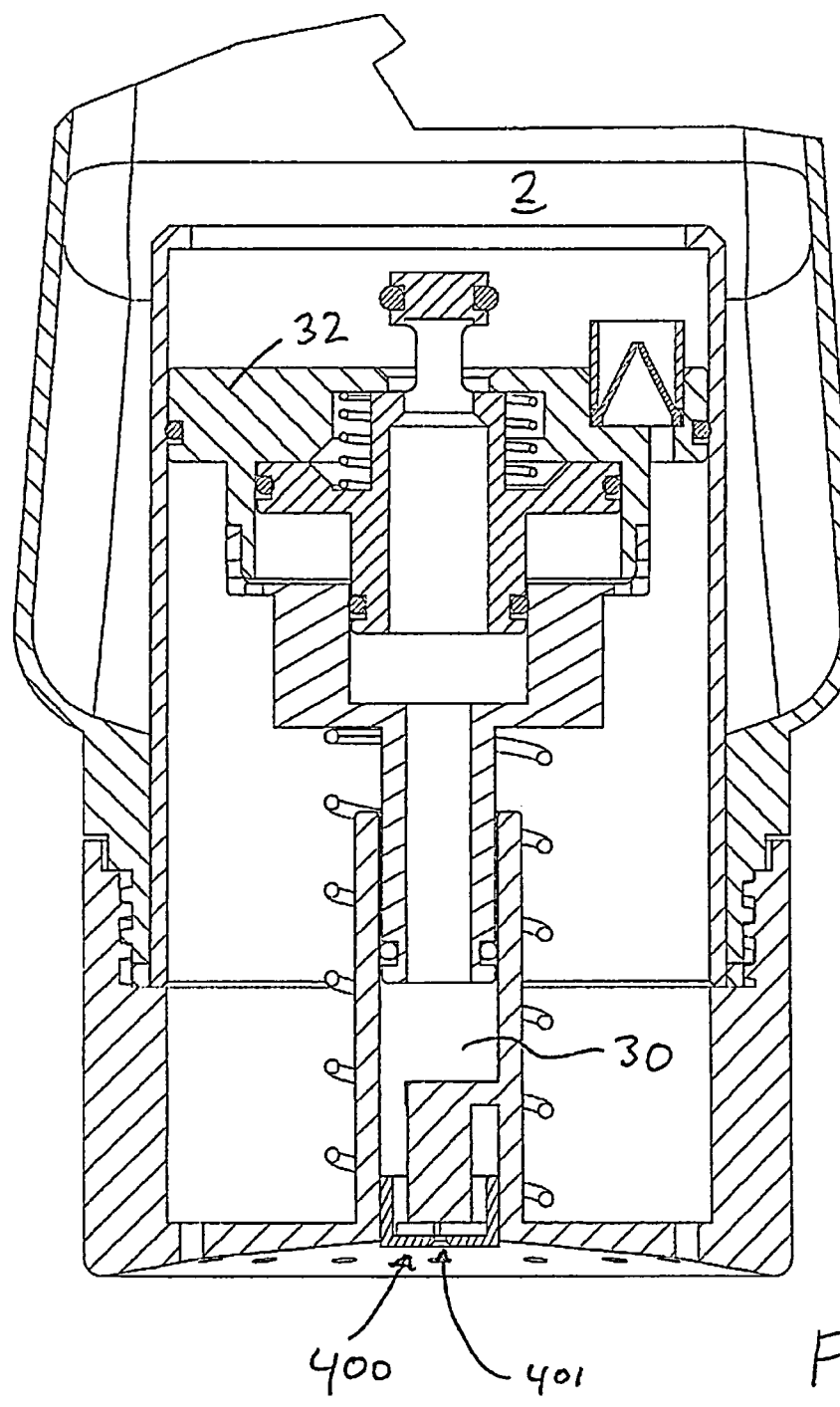
FIG. 13 shows on a larger scale a portion dispensing device according to the invention having a spray head to dispense a portioned spray.

FIG. 13 shows on a larger scale a portion dispensing device according to the invention having a spray head to dispense a portioned spray. In FIG. 13 parts corresponding to parts identical or similar in functionality to parts of one or more of the preceding exemplary embodiments have been denoted with the same reference numeral.

As can be seen the effective cross-section of the product chamber 30 is much smaller than the effective cross-section of the piston 32 on which the reservoir pressure acts during dispensing. This causes an intensifying effect, e.g. so as to obtain a product pressure in the chamber between 5 and 10 bar, with an acceptable low squeeze force for the container by the user.

In this embodiment the product is a liquid product, that is dispensed in the form of a spray of atomized or nebulized product. A spray head 400 is provided at the outlet of the product chamber 30 having one or more spray discharge orifices 401. Spray heads are well known in the art.

Figure 14:
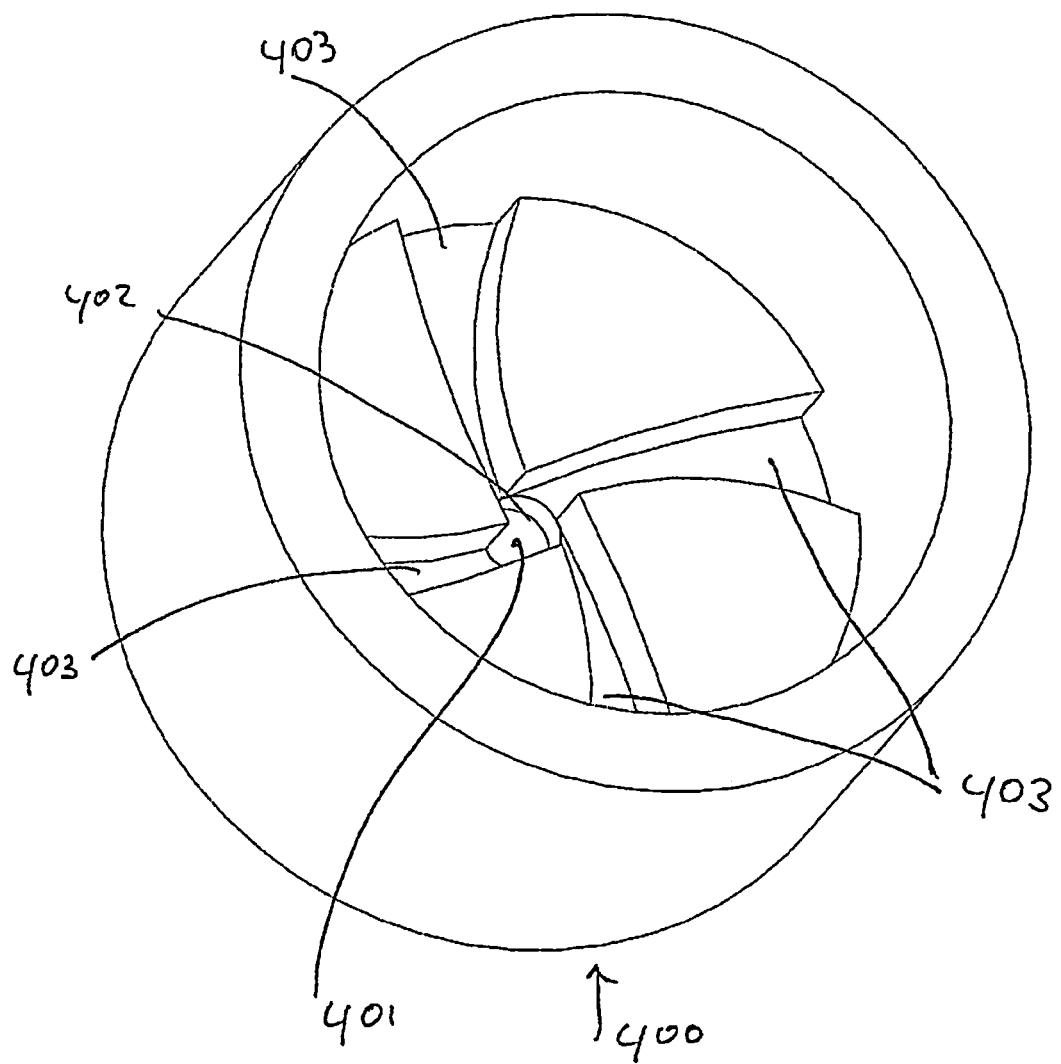
FIG. 14 shows in a perspective view the spray head of the device of FIG. 13.

In this example, as shown in FIG. 14, the spray head comprises, upstream of the orifice 401, a swirl chamber 402 wherein preferably multiple streams of liquid product are entered at high speed in an arrangement that cause swirl. In this example multiple channels 403 are formed in the spray head, generally tangentially to the swirl chamber 402, so as the cause a high-speed swirl.

Figure 15:
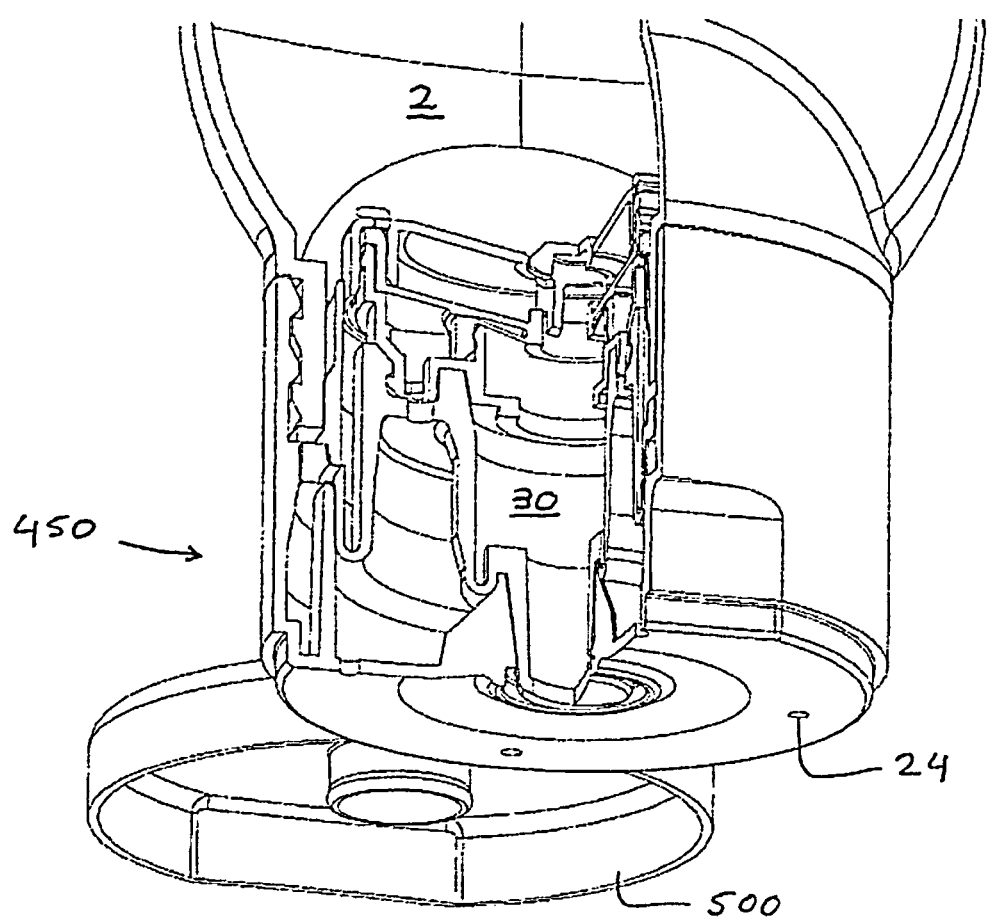
FIG. 15 shows partly in cross-section a further example of a container with a portion dispensing device according to the invention in preferred inverted dispensing position, FIG. 16A the portion dispensing device of FIG. 15 in another cross-section, FIG. 16B a detail of FIG. 16A on a larger scale.
Figure 16A:
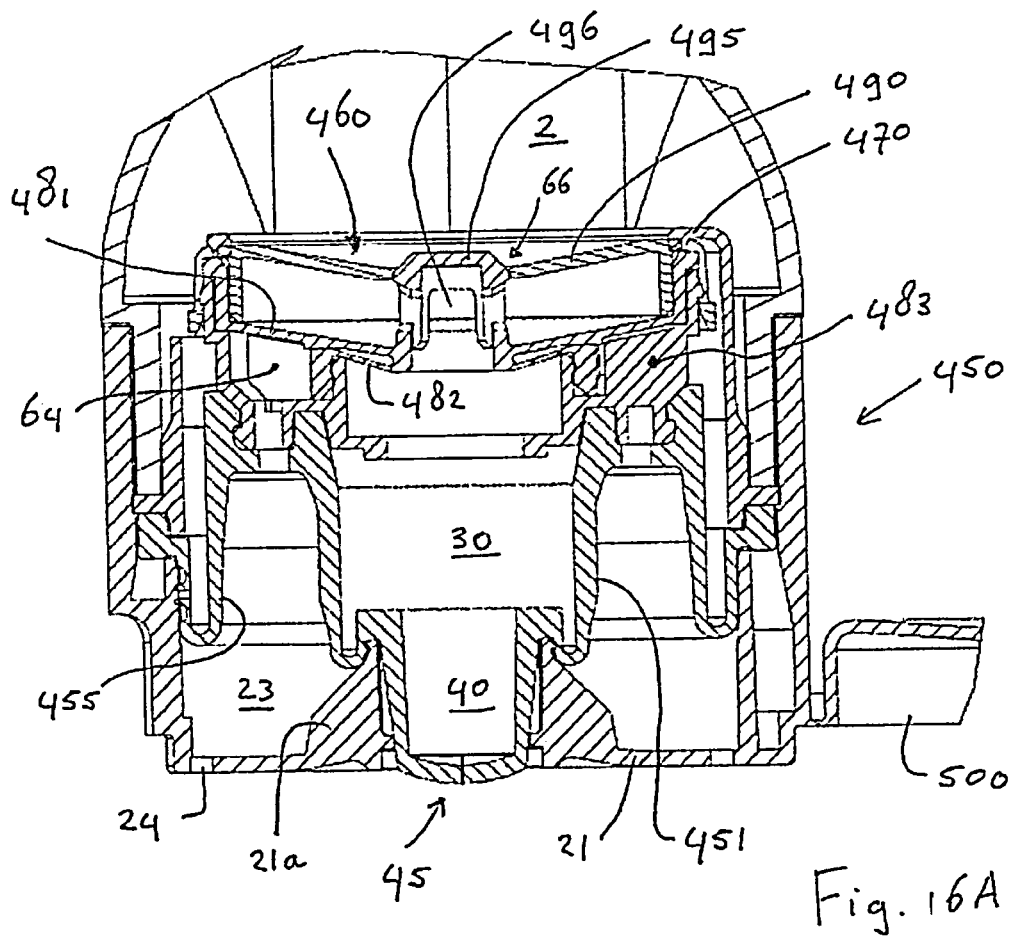
Figure 16B:
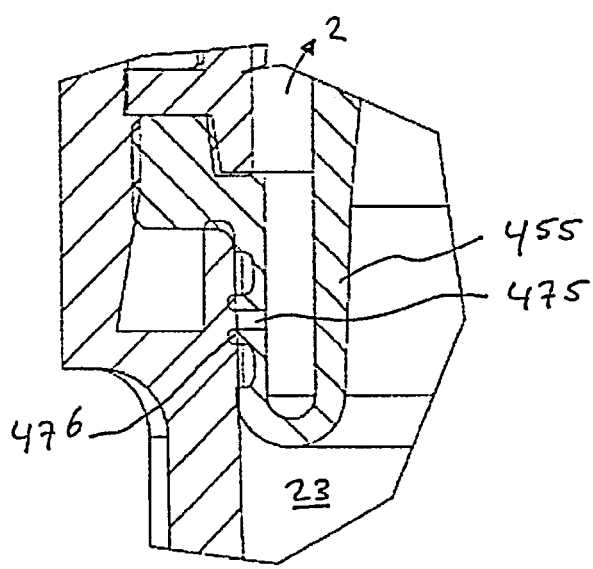

With reference to FIGS. 15 and 16A, 16B further example of a container (with reservoir 2) with a portion dispensing device 450 according to the invention will be shortly discussed.

In the embodiment shown here parts corresponding to parts identical or similar to parts of the previously discussed embodiments have been denoted with the same reference numeral.

Similar to the embodiment described with reference to FIGS. 5A and 5B the product chamber 30 here is formed mainly by a flexible bellows 451. As an optional feature outlet valve 45 is integral with the bellows 451.

At the side opposed from the outlet valve 45 the bellows 451 connects to an underpressure actuated inlet valve 460 that functions as described with reference to e.g. inlet valve 60 in order to govern the passage of product from the reservoir 2 into the chamber 30.

The bellows 451 is construed for axial compression during dispensing of product from the chamber 30, here, as is preferred, the bellows 451 having a section that rolls over an inwardly protruding collar 21a of the dispensing wall or top wall 21 during the dispensing.

As is preferred, the bellows 451 is combined with a further, coaxial bellows 455. As most preferred the bellows 451 and 455 are integrated in a single moulded component.

Bellows 455 has an outer edge fastened to the housing of the device. A roll section extends from said fastened edge, first towards the dispensing wall 21 and then, via a single folded portion of the bellows 455 away from wall 21 towards the inlet valve 460.

There is no cylinder-piston structure in this embodiment, as e.g. is present in FIGS. 5A, B. The inlet valve 460 is not guided in a cylinder. In its initial position (as shown) the inlet valve 460 rests against an abutment member 470 that is part of the housing of the device. Upon compression of the container, the pressure in reservoir 2 causes the inlet valve 460 to move away from said abutment member whilst the bellows are deformed from said initial situation.

The bellows basically ensure suitable guidance of the inlet valve 460 during the reciprocal motion thereof. This avoids friction as is seen in a cylinder-piston arrangement.

As is preferred the embodiment lacks a restoring spring, as the bellows provide the restoring force for the chamber 30.

The bellows 451, as is preferred, also serves to govern the venting of the reservoir 2. To do so, the bellows 451 is provided with a vent passage 475, that is best seen in FIG. 16B. The vent passage 475 is provided in a portion of the bellows 451 that contacts the housing of the device, preferably near the fastened edge of the bellows. The vent passage 475 may be designed with a sealing lip 476, so as to enhance a sealing engagement with the housing of the device. At one side, the exterior side, the bellows 455 (and bellows 451) is exposed to the atmosphere via openings 24 and the space 23 that is effectively delimited by said bellows. At the outer side, the interior side, the bellows 455 is in open, non-valved, communication with the reservoir 2. Underpressure in the reservoir 2 can be compensated by entry of air via openings 24, space 23, and passage 475. The actual venting will occur only if the pressure conditions are such that air can come between the bellows 455 and the opposed wall portion of the housing and such that sealing lip 476 parts from the opposed wall portion. In the initial position the passage 475 is relatively close to the fold in said bellows 455, but as the bellows 455 is compressed, there will be more overlap or contact between the bellows 455 and said wall. The actual opening of the passage 475 is thereof dependent on the degree of overlap, as well as the stiffness of the bellows, and this allows to optimize the venting of the reservoir 2.

As is preferred, in the inlet valve 460 provisions have been made to reduce sliding contact and associated frictional effects. In particular the movable valve member 480 now comprises a flexible diaphragm 481, as well as a flexible annular connector portion 482, preferably said flexible parts being manufactured as a unitary component. Said portion 482 connects the movable member in a mobile manner to a rigid body member 483 of the inlet valve. Here said body member is fastened to the component forming both the bellows 451 and the bellows 455.

The flexible connector portion 482 forms a barrier between chamber 30 and atmospheric pressure space 64 that is in open, non-valved, communication with space 23 and thus to the atmospheric pressure. The surface of the diaphragm 481 is greater than the surface of portion 482 to obtain a proper functioning of the inlet valve 460. As is preferred the connector portion 482, in the closed position of the inlet valve 460, is pretensioned so as to open the valve, at the same time the diaphragm 481 being pretensioned so as to close the valve. This allows to optimize the actual opening behaviour of the valve 460.

Seat 66 is formed by a rigid member 490, that here, as is preferred, also serves to clampingly retain the flexible component as it is clamped between member 490 and the member 483.

A tubular portion 495 of the movable valve member has one or more ports 496, similar to ports 163.

The FIG. 15 also illustrates the provision of a cap 500 to cover the dispensing outlet, here a flip-top cap.

The skilled person will appreciate that a feature, e.g. a preferred feature, disclosed herein with reference to one or more exemplary embodiments may also be combined with one or more of the other exemplary embodiments.

What is claimed is:

1. A container with a portion dispensing device for dispensing portions of a product from the container, the container having a container body with a main reservoir for storage of product, the portion dispensing device comprising:
   a variable volume product chamber and associated variable volume product chamber restoring means, which variable volume product chamber has:
      a product outlet for passing product from the variable volume product chamber, wherein an outlet valve is associated with said outlet, and
      a product inlet in communication with the main reservoir, wherein an inlet valve is associated with said product inlet,
   wherein the variable volume product chamber has a volume that is reduced upon increased pressurization of product in the main reservoir of the container, and that is increased, at least aided by said variable volume product chamber restoring means, when the increased pressurization of product in the main reservoir of the container is removed,
   wherein the inlet valve is configured to close the product inlet upon increase of pressurization of the product in the main reservoir so that product is then passed from the chamber via the product outlet,
   wherein the inlet valve is configured to open the product inlet upon removal of said increased pressurization so as to allow for the flow of product from the main reservoir into the variable volume product chamber,
   wherein the inlet valve has a movable closure member and an associated seat for said closure member,
   wherein increased pressurization of product in the main reservoir urges the movable closure member onto the seat,
   wherein the inlet valve is an underpressure actuated inlet valve, the movable closure member having a first surface in communication with the atmosphere so as to be exposed to atmospheric pressure and a second surface in communication with the variable volume product chamber so as to be exposed to pressure in said variable volume product chamber, and
   wherein the inlet valve being configured such that—when an underpressure is created in the variable volume product chamber as a result of increase of the volume of said chamber due to removal of the increased pressurization of the product in the main reservoir—the movable valve member is caused to move from its seat, thereby allowing flow of product from the main reservoir into the variable volume product chamber.

2. The container according to claim 1, wherein the variable volume product chamber is delimited by a cylinder and a piston that is reciprocable in the cylinder.

3. The container according to claim 2, wherein the inlet valve is arranged in the piston.

4. The container according to claim 1, wherein a variable chamber restoring spring is provided.

5. The container according to claim 1, wherein the outlet valve is a self-closing valve.

6. The container according to claim 1, wherein the inlet valve comprises an inlet valve body with a bore in which the movable valve member is reciprocable, the movable valve member sealingly engaging an inner surface of the bore and delimiting in said bore an underpressure space and an atmospheric pressure space, the inlet valve body having a passage connecting the atmospheric pressure space to the atmosphere and a passage connecting the underpressure space with the variable volume product chamber.

7. The container according to claim 6, wherein the movable valve member comprises a tubular main body portion and an annular flange surrounding said main body portion.

8. The container according to claim 1, wherein the inlet valve comprises a restoring means that provide a restoring force urging the movable inlet valve member towards its seat.

9. The container according to claim 1, wherein the inlet valve comprises a flexible diaphragm fastened at its outer periphery to the valve body, a first surface of the flexible diaphragm being in communication with the atmosphere and a second surface of the diaphragm being in communication with the variable volume product chamber.

10. The container according to claim 1, wherein the portion dispensing device has a setting means adapted to allow the user to set the volume of a portion to be dispensed.

11. The container according to claim 10, wherein the variable volume product chamber is delimited by a cylinder and a piston that is reciprocable in the cylinder, and wherein the setting means are adapted to provide multiple distinct positions of the stroke of the piston.

12. The container according to one claim 1, wherein the portion dispensing device has a continuous open setting device adapted to hold the movable inlet valve member off its seat to allow for continuous dispensing from the container.

13. The container according to claim 1, wherein the container has a vent passage to allow for entry of air into the container to compensate for the dispensed product.

14. The container according to claim 13, wherein the variable volume product chamber is bypassed by the vent passage.

15. The container according to claim 1, wherein the dispensing device is adapted to mix the product emerging from the variable volume product chamber with air so as to dispense a portion of foamed or aerated product.

16. The container according to claim 15, wherein the dispensing device further comprises a variable volume air chamber.

17. The container according to claim 15, wherein the variable volume product chamber is delimited by a cylinder and a piston that is reciprocable in the cylinder, and wherein the dispensing device further comprises a variable volume air chamber, wherein is single piston is common for both the variable volume product chamber and the variable volume air chamber.

18. Method for dispensing portions of a product from a container, wherein use is made of a container of claim 1.

19. The container according to claim 1, wherein a variable chamber restoring spring is provided mounted in the variable volume product chamber.

20. The container according to claim 1, wherein the variable volume product chamber is delimited by a cylinder and a piston that is reciprocable in the cylinder, wherein the inlet valve is arranged in the piston, wherein a variable chamber restoring spring is provided in the variable volume product chamber, which restoring spring engages on the piston, and wherein the outlet valve is a self-closing valve.

21. The container according to claim 1, wherein the container body is a squeeze bottle.

22. A portion dispensing device to be mounted on a container for dispensing portions of a product from the container, wherein the container has a container body with a main reservoir for storage of product, the portion dispensing device comprising:
a variable volume product chamber and associated variable volume product chamber restoring means,
which variable volume product chamber has:
a product outlet for passing product from the variable volume product chamber, wherein an outlet valve is associated with said outlet,
a product inlet in communication with the main reservoir, wherein an inlet valve is associated with said product inlet,
wherein the variable volume product chamber has a volume that is reduced upon increased pressurization of product in the main reservoir of the container, and that is increased, at least aided by said variable volume product chamber restoring means, when the increased pressurization of product in the main reservoir of the container is removed,
wherein the inlet valve is configured to close the product inlet upon increase of pressurization of the product in the main reservoir so that product is then passed from the chamber via the product outlet,
wherein the inlet valve is configured to open the product inlet upon removal of said increased pressurization so as to allow for the flow of product from the main reservoir into the variable volume product chamber,
wherein the inlet valve has a movable closure member and an associated seat for said closure member,
wherein increased pressurization of product in the main reservoir urges the movable closure member onto the seat,
wherein the inlet valve is an underpressure actuated inlet valve, the movable closure member having a first surface in communication with the atmosphere so as to be exposed to atmospheric pressure and a second surface in communication with the variable volume product chamber so as to be exposed to pressure in said variable volume product chamber, and
wherein the inlet valve being configured such that—when an underpressure is created in the variable volume product chamber as a result of increase of the volume of said chamber due to removal of the increased pressurization of the product in the main reservoir—the movable valve member is caused to move from its seat, thereby allowing flow of product from the main reservoir into the variable volume product chamber.

* * * * *